US006526639B2

(12) United States Patent
Duan et al.

(10) Patent No.: US 6,526,639 B2
(45) Date of Patent: Mar. 4, 2003

(54) METHOD FOR BURNISHING HARD DISKS

(75) Inventors: Shanlin Duan, Fremont, CA (US); Wei-Ming Lee, Pleasanton, CA (US); Yu Lo, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/944,226

(22) Filed: Aug. 30, 2001

(65) Prior Publication Data

US 2002/0029448 A1 Mar. 14, 2002

Related U.S. Application Data

(63) Continuation-in-part of application No. 09/360,477, filed on Jul. 23, 1999, now Pat. No. 6,357,095, which is a continuation-in-part of application No. 09/190,946, filed on Nov. 12, 1998, now Pat. No. 6,249,945.

(51) Int. Cl.$^7$ .............................................. B24B 39/00
(52) U.S. Cl. ..................... 29/90.01; 451/63; 451/290
(58) Field of Search ...................... 29/90.01; 451/290, 451/317, 324, 527, 528, 530, 547, 41, 63

(56) References Cited

U.S. PATENT DOCUMENTS

| | | | |
|---|---|---|---|
| 4,330,910 A | | 5/1982 | Schachl et al. ............. 29/90 R |
| 4,412,400 A | | 11/1983 | Hammond .................... 51/58 |
| 4,845,816 A | | 7/1989 | Nanis ........................ 29/90.01 |
| 5,063,712 A | | 11/1991 | Hamilton et al. ............ 51/67 |
| 5,658,191 A | * | 8/1997 | Brezoczky ................. 451/324 |
| 5,782,680 A | | 7/1998 | Pilsan ........................ 451/317 |
| 5,863,237 A | | 1/1999 | Felts et al. .................... 451/41 |
| 5,868,806 A | | 2/1999 | Nishio et al. ................ 51/297 |
| 5,880,899 A | | 3/1999 | Blachek et al. .............. 360/66 |
| 5,942,680 A | * | 8/1999 | Boutaghou ................. 73/105 |
| 5,980,369 A | | 11/1999 | Burga et al. ................ 451/317 |
| 6,019,672 A | | 2/2000 | Damgaard ................... 451/527 |
| 6,183,349 B1 | | 2/2001 | Burga et al. .................. 451/41 |
| 6,226,151 B1 | * | 5/2001 | Haddock .................. 360/236.6 |
| 6,227,042 B1 | * | 5/2001 | Ruiz ........................... 73/105 |
| 6,230,380 B1 | | 5/2001 | Wang et al. ............... 29/90.01 |
| 6,249,945 B1 | * | 6/2001 | Lee ............................ 29/90.01 |
| 6,267,645 B1 | | 7/2001 | Burga et al. .................. 451/41 |
| 6,273,793 B1 | * | 8/2001 | Liners et al. ................. 451/41 |
| 6,296,552 B1 | * | 10/2001 | Boutaghou et al. .......... 451/41 |
| 6,309,283 B1 | * | 10/2001 | Liners et al. ................. 451/41 |
| 6,322,431 B1 | * | 11/2001 | Schaenzer et al. .......... 451/317 |
| 6,349,458 B1 | * | 2/2002 | Al-Rawi .................... 29/90.01 |
| 6,357,095 B1 | * | 3/2002 | Duan et al. ................ 29/90.01 |
| 6,358,123 B1 | * | 3/2002 | Liners et al. ................. 451/41 |

\* cited by examiner

Primary Examiner—Gregory M. Vidovich
Assistant Examiner—Essama Omgba
(74) Attorney, Agent, or Firm—Robert O. Guillot; Intellectual Property Law Offices

(57) ABSTRACT

The disk burnishing process is conducted with a contact flying burnishing head wherein the leading edge of the burnishing head is disposed above the surface of the disk, while the trailing edge of the burnishing head makes contact with the surface of the disk. The contact flying configuration of the burnishing head is obtained by controlling the rotating disk RPM in conjunction with the burnishing head design characteristics.

In the contact flying burnishing process, the burnishing edges of the several burnishing pads of the head are disposed at different heights relative to the disk surface, such that the leading burnishing pad edges are higher than the trailing burnishing pad edges. In this configuration, high asperities are trimmed by the burnishing pads while low asperities are not. Thus, a disk is properly burnished for subsequent hard disk drive performance with a minimum of surface debris being created by the burnishing process.

12 Claims, 4 Drawing Sheets

METHOD FOR BURNISHING HARD DISKS

CROSS-REFERENCE TO RELATED APPLICATIONS

This application is a continuation in part and claims priority to U.S. patent application Ser. No. 09/360,477 filed Jul. 23, 1999, now U.S. Pat. No. 6,357,095, entitled Hard Disk Burnishing Head (the disclosure of which is incorporated herein as though set forth in full), which is a continuation in part and claims priority to issued U.S. Pat. No. 6,249,945, Ser. No. 09/190,946, entitled Hard Disk Burnishing Head, filed Nov. 12, 1998.

BACKGROUND OF THE INVENTION

1. Field of the Invention

The present invention relates generally to burnishing devices for hard disks, and more particularly to a method for burnishing hard disks using a partially flying burnish head having a plurality of burnishing pads.

2. Description of the Prior Art

A hard disk is cleaned and burnished following the deposition of thin film layers to remove debris and asperities from the surface. Such debris and asperities must be removed, or at least reduced in height, such that a slider will fly smoothly over the disk surface. As slider flying heights become lower for improved higher density disks, the disks must be burnished to a greater extent than was heretofore necessary to lower the projection height of such asperities and more efficiently remove disk surface debris.

Several different burnishing pad designs are currently utilized. Some heads have a burnishing ridge providing a burnishing edge that extends across the entire front surface of the head. Other current head designs have burnishing members on the left side and right side of the burnishing head, but have a lengthwise channel between the left and right burnishing members. In such heads, a significant portion of the burnishing head does not burnish the disk, resulting in significant inefficiency in the burnishing process.

A further prior art burnishing head is described in U.S. Pat. No. 4,845,816. It has a waffle type pattern of burnishing pads; that is, a plurality of diamond shaped burnishing pads that are disposed on the burnishing head surface. The diamond shaped pads are oriented such that the point of each diamond shaped pad is directed towards the media to be burnished. In distinction to this pad configuration, burnishing pads of the present invention each have a straight burnishing edge that is directed towards the media to be burnished. In a prior art variation of this waffle patterned head the leading burnishing pads may be triangularly shaped, as are the leading pads of the present invention.

In the prior art method for burnishing hard disks, the burnishing head is placed upon the surface of a rotating disk and moved radially across the surface of the disk as the disk rotates. There is full contact between the surface of the burnishing head and the surface of the rotating disk. In this disk burnishing method both high asperities and low asperities are contacted by the burnishing pads of the burnishing head and are removed. A large quantity of surface debris is thereby generated in the burnishing process. Significantly, it is not necessary to remove many of the low asperities, in that the flying height of a magnetic head slider of a disk drive is higher than the low asperities. Therefore, the prior art full contact burnishing head method of disk burnishing removes more asperities than are necessary, and thereby creates more surface debris which must be removed than is necessary.

A need therefore exists for improvements in the methods for burnishing hard disks in which high asperities are removed and in which low asperities are not removed, such that the creation of surface debris in the burnishing process is minimized while the failure rate of hard disks following burnishing is decreased. The present invention provides a method for burnishing hard disks that accomplishes these results.

SUMMARY OF THE INVENTION

The disk burnishing method of the present invention utilizes a burnishing head as described above in a disk contact flying configuration. That is, the disk burnishing process is conducted such that the leading edge of the burnishing head is disposed above the surface of the disk, while the trailing edge of the burnishing head makes contact with the surface of the disk; this partially flying burnishing head configuration is termed "contact flying" herein. The contact flying configuration of the burnishing head is obtained by controlling the rotating disk RPM in conjunction with the burnishing head design characteristics, such that the forward edge of the burnishing head is lifted off the disk surface while the trailing edge makes contact with the disk surface.

A preferred embodiment of a burnishing head for hard disk processing according to the method of the present invention includes a solid body having generally rectangular surfaces, including an upper surface, a burnishing pad surface, a front surface, a rear surface and two side surfaces. A plurality of burnishing pads are disposed upon the burnishing pad surface. The pads are shaped such that each pad has a burnishing edge that is generally parallel to said front surface and therefore orthogonal to the direction of media travel. The burnishing pads are preferably configured such that two frontward leading pads are disposed proximate the front surface in a spaced apart relationship and one leading middle pad is disposed rearwardly of the two frontward leading pads and generally between the two frontward leading pads. Two rear pads are disposed generally rearwardly of the leading middle pad in a spaced apart relationship, and one rearward pad is disposed rearwardly of the two rear pads and generally between the two rear pads. In the preferred embodiment the pads are generally triangular in shape and the outer surface of the leading and rearward pads is tapered.

When disk burnishing is performed utilizing the contact flying burnishing head, the burnishing edges of the several burnishing pads are disposed at different heights relative to the disk surface, such that the leading burnishing pad edges are higher than the trailing burnishing pad edges. In this contact flying configuration, high asperities are trimmed by the burnishing pads while low asperities are not. Thus, a disk is properly burnished for subsequent hard disk drive performance with a minimum of surface debris being created by the burnishing process.

It is an advantage of the present invention that a more efficient disk burnishing method is provided.

It is another advantage of the disk burnishing method of the present invention that the amount of surface debris generated during the disk burnishing process is minimized.

It is a further advantage of the disk burnishing method of the present invention that high asperities on a hard disk are removed, while low asperities are not removed.

It is yet another advantage of the disk burnishing method of the present invention that the disk qualification glide height can be reduced.

It is yet a further advantage of the disk burnishing method of the present invention that the hard disk failure rate following burnishing is reduced.

It is still another advantage of the disk burnishing method of the present invention that the disk production yield is increased.

It is still a further advantage of the disk burnishing method of the present invention that the burnishing head wear is reduced, such that the head lifetime is increased.

It is yet another advantage of the disk burnishing method of the present invention that damage to disks during the burnishing process is reduced.

These and other features and advantages of the present invention will become apparent to those skilled in the art upon reading the following detailed description which makes reference to the several figures of the drawings.

IN THE DRAWINGS

DETAILED DESCRIPTION OF THE PREFERRED EMBODIMENTS

Figure 1:
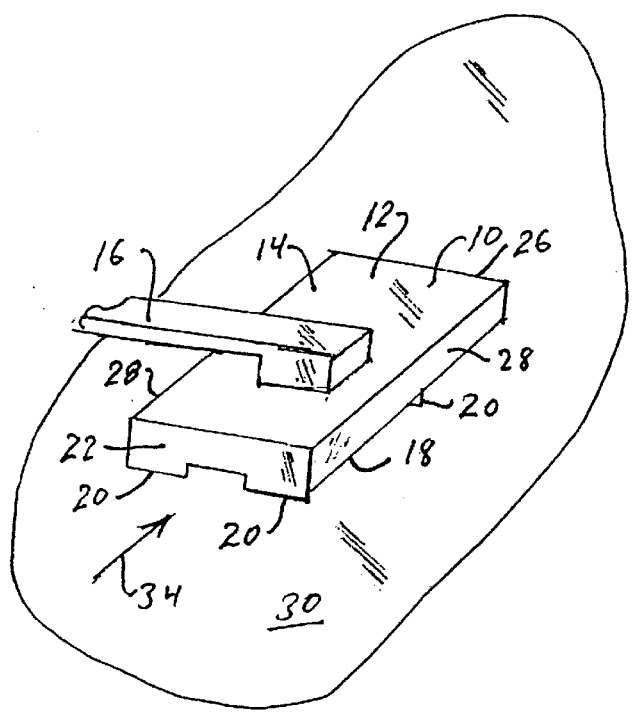
FIG. 1 is a perspective view of the burnish head of the present invention disposed in association with a hard disk.
Figure 2:
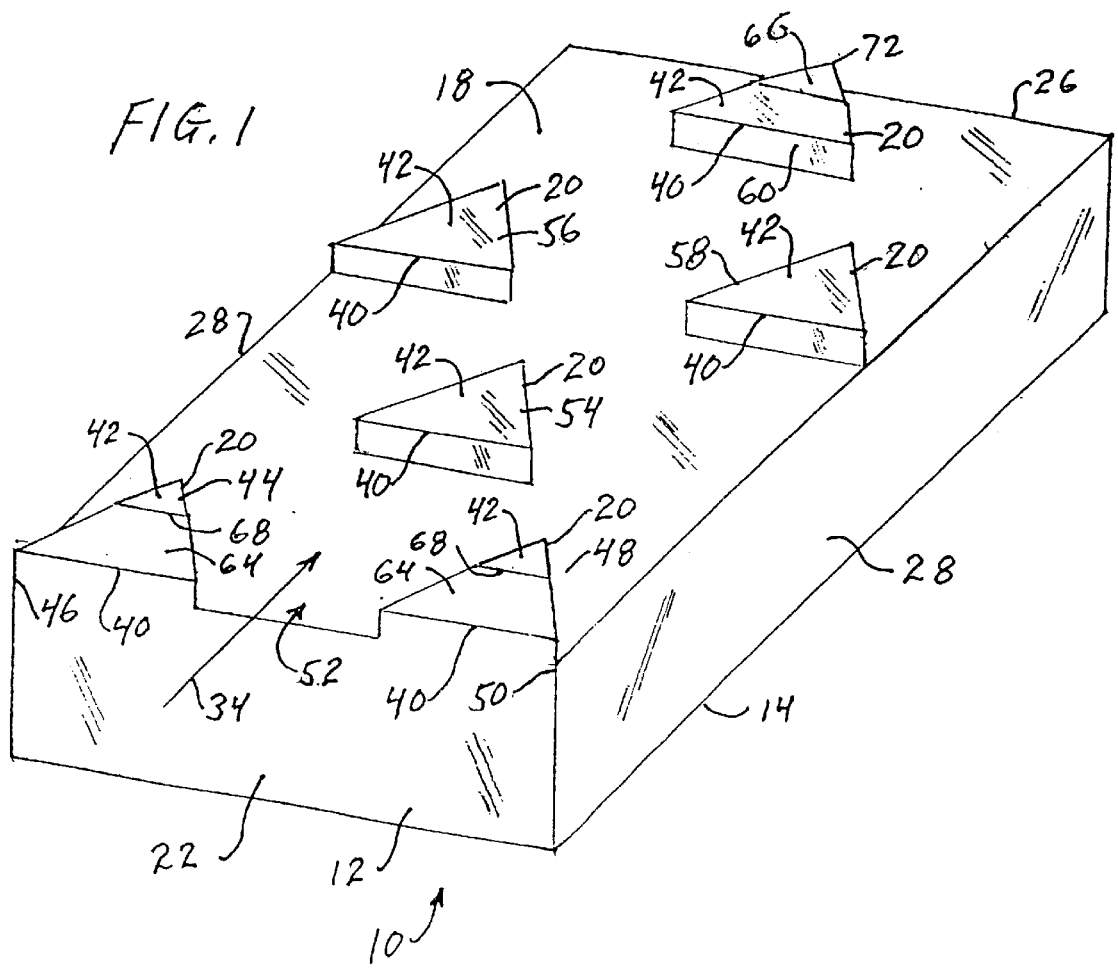
FIG. 2 is a perspective view of a preferred embodiment of the hard disk burnishing head of the present invention as depicted in FIG. 1.

As depicted in FIG. 1, the hard disk burnishing head 10 of the present invention is formed from a generally solid, rectangular body of ceramic material 12 having an upper surface 14 that is engagable with a generally depicted head support arm 16, a burnishing pad surface 18 having a plurality of burnishing pads 20 formed thereon, a front surface 22, a rear surface 26 and side surfaces 28. The head 10 is designed to burnish the surface of a hard disk 30 which rotates towards the front surface 22 in the direction of arrow 34. Further details of the burnishing head 10 are next described with the aid of FIGS. 2–6.

Figure 5:
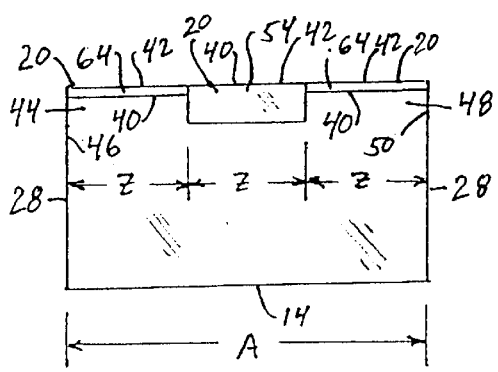
FIG. 5 is a front elevational view of the burnishing head depicted in FIG. 2.
Figure 6:
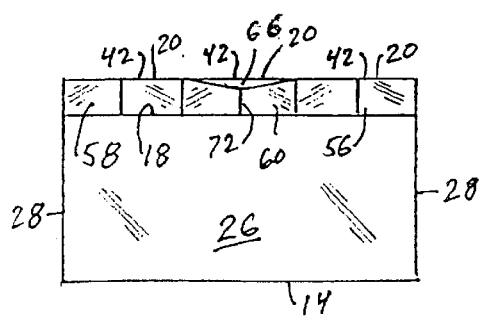
FIG. 6 is a rear elevational view of the burnishing head depicted in FIG. 2.

As depicted in FIGS. 2–6, a plurality of burnishing pads 20 are formed on the burnishing pad surface 18 of the head 10. The burnishing pads 20 project outwardly from the surface 18, and each pad is preferably oriented such that a straight burnishing edge 40 of each pad 20 faces towards the front surface 22 of the head 10, whereby the burnishing edge 40 of each pad 20 is generally parallel to the front surface 22 and orthogonal to the media travel direction 34. Thus, the burnishing edge 40 of each pad 20 forms the leading pad edge for collecting debris and interacting with asperities disposed on the disk surface. Each burnishing pad 20 is preferably formed in a triangular shape and has a flat outer surface 42. The preferred pad configuration includes a left leading pad 44 formed on a left side edge 46 of the front surface 22, a right leading pad 48 formed on a right side edge 50 of the front surface 22. The pads 44 and 48 are spaced apart such that a gap 52 formed between the pads 44 and 48. A third middle leading pad 54 is formed rearwardly and centrally of the pads 44 and 48, such that pad 54 occupies the gap 52 when the head 10 is viewed from the front, as depicted in FIG. 5. Two rear pads 56 and 58 are disposed rearwardly of pad 54, and are spaced apart in a similar manner to pads 44 and 48. A rearward pad 60 is disposed rearwardly and centrally of pads 56 and 58, such that it occupies the space between the pads 56 and 58 when the head 10 is viewed from the front, in a similar manner to pad 54.

As is best seen in the front view depicted in FIG. 5, the three leading triangular pads 44, 48 and 52 are sized and positioned such that the leading edges 40 of each pad 44, 48 and 54 are aligned such that when combined they effectively extend across the full width (A) of the front surface 22 with no gaps in the combined leading edge. That is, each front edge 40 of each triangular pad 20 has a length of A/3. Similarly, the three triangular pads 56, 58 and 60 are sized and positioned such that the leading edges 40 of these pads effectively extend across the width of the head 10 with no gaps in the combined leading edge thereof. The configuration of the triangular pads 20 on the head 10 can be thought of as two 3-pad sets, wherein each 3-pad set (specifically pad set 44, 48 and 54, and pad set 56, 58 and 60) combines to form an effective burnishing edge that extends across the width A of the head 10. Thus, each head 10 effectively has two combined burnishing edges that extend across its width A, one combined edge being formed from each set of 3 triangular pads. Therefore, each time the head 10 passes a particular location on the surface of a hard disk 30, two burnishing edges pass over the location.

Figure 3:
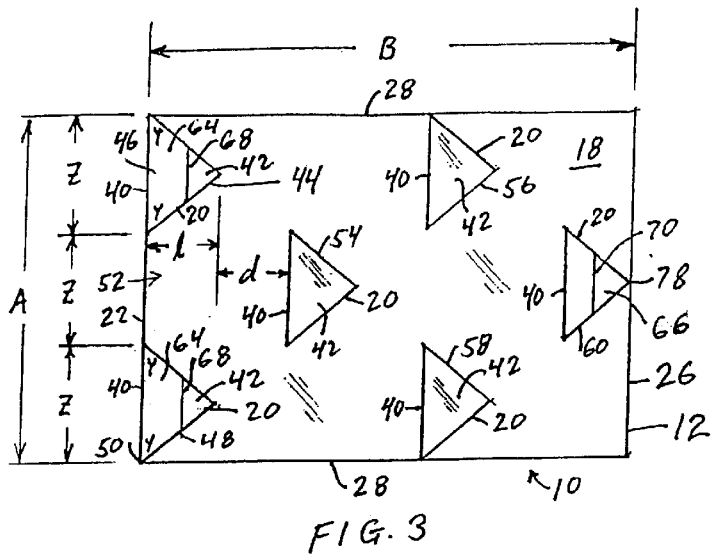
FIG. 3 is a top plan view of the burnishing head depicted in FIG. 2.
Figure 4:
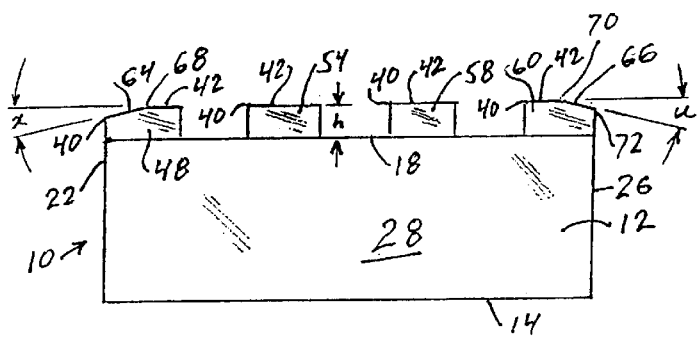
FIG. 4 is a side elevational view of the burnishing head depicted in FIG. 2.

In the preferred embodiment, enhanced head performance is obtained by modifications to the left and right leading burnishing pads 44 and 48 and the rearward burnishing pad 60. Specifically, to prevent gouging of the disk surface, the outer surface 42 of the left and right leading pads 44 and 48 is tapered. That is, as is best seen in the side view of FIG. 4, the outer surface 64 of pad 48 is tapered from a point 68 approximately ½ of the pad length back from the edge 40 at a slope angle x of approximately 1–3 degrees towards the front surface 22 to form the burnishing edge 40. The pad 44 is tapered in a similar manner as depicted in FIG. 3. Additionally, to prevent scratching of the hard disk surface by the rearward pad 60, the outer surface 66 of the pad 60 is tapered rearwardly from a point 70 towards the rear apex 72 of the pad 60 at a slope angle u of approximately 1–3 degrees.

As is best seen in the top view of FIG. 3 the triangular pads 20 in the preferred embodiment have the following approximate sizes, locations and relationships. Where the length of the burnishing edge 40 of a pad 20 is z, the width A of the head 10 is 3z and the length B of the head 10 is approximately 4z. The distance d between the pads 20 is approximately equal to the length 1 of a pad 20, and the corner angle y of the pads 20 is approximately 41°. The pad configuration depicted in the preferred embodiment 10 is particularly useful for a burnishing head 10 having a width A of approximately 1.5 mm having burnishing pads 20 formed with a height h of approximately 0.1–0.2 mm. Of course, burnish heads may be formed within the scope of the invention having a corner angle y that is different from approximately 41°, which generally results in changing the shapes and relative locations of the triangular pads, and changing the length B of the head 10.

While the triangular pad configuration depicted hereabove is a preferred embodiment for the burnishing head size described above, larger or smaller burnishing heads may advantageously be formed with a greater or fewer number of triangular pads which are disposed in configurations other than as depicted hereabove. These other configurations as may be advantageously developed, but which nonetheless include the multiple discrete burnishing pads of the embodiment 10 described hereabove, are considered by the inventor to be within the scope of the invention described herein. A significant feature of such other configurations is that the leading edges of the front burnishing pads are tapered 64 along with the tapering 66 of the trailing edges of the rearward burnishing pad 60, such that contact flying of the burnishing head in accordance with the method of the present invention may be accomplished, as is next described in detail with the aid of FIGS. 7–11.

Figure 7:
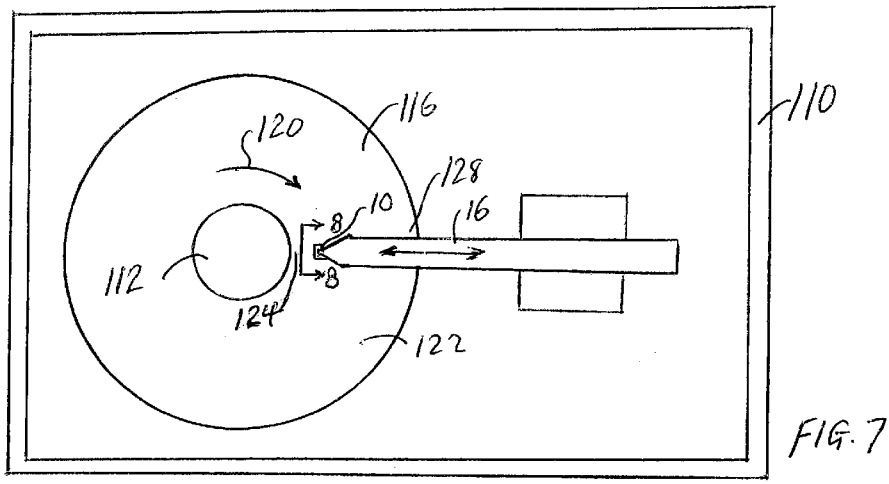
FIG. 7 is a top plan view generally depicting a hard disk burnishing device.
Figure 8:
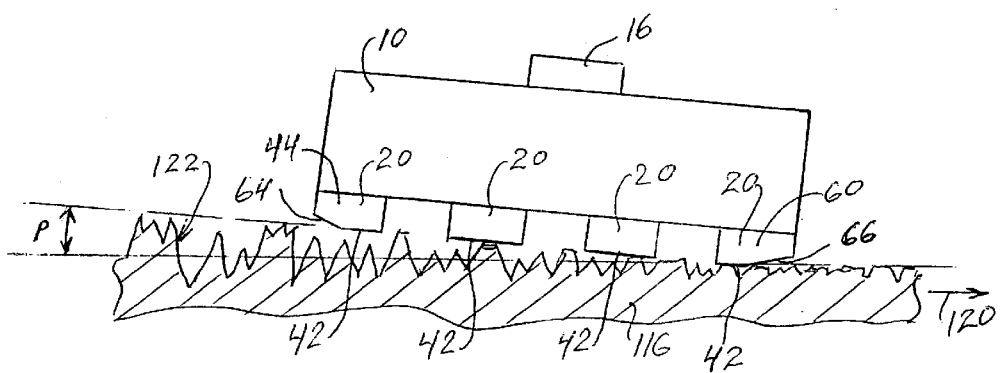
FIG. 8 is a side elevational view depicting the contact flying hard disk burnishing method of the present invention.

FIG. 7 is a top plan view generally depicting a hard disk burnishing device, and FIG. 8 is a side elevational view taking along lines 8—8 of FIG. 7 that depicts the burnishing head orientation upon a disk during the disk burnishing process of the present invention. As depicted in FIG. 7, a disk burnishing device 110 generally includes a motorized spindle 112 upon which a disk to be burnished 116 is rotatably mounted to rotate in the direction of arrow 120. A burnishing head 10 of the present invention is mounted upon a movable arm 16 which is capable of moving the burnishing head 10 in a radial direction across the surface 122 of the disk 116 from its inner diameter 124 to its outer diameter 128.

With reference to FIG. 8, the burnishing head 10 is generally pivotally mounted upon the arm 16 in a manner similar to the mounting of a magnetic head slider within a magnetic hard disk drive, as is well known to those skilled in the art. Therefore, as depicted in FIG. 8, the burnishing head 10 is mounted upon the arm 16 such that the flat mounting surface 42 of the burnishing pads 20 is adapted to form a pitch angle p relative to the surface 122 of the hard disk 116.

In the disk burnishing method of the present invention the disk 116 to be burnished is mounted upon the spindle 112 and rotated at a high RPM, to achieve a disk surface velocity such as approximately 16 meters per second. The burnishing head 10 is thereafter lowered towards the disk. Significantly, the burnishing device 110 is designed such that the burnishing head 10 flies above the surface of the disk 116. That is, the aerodynamic properties of the burnishing head 10, which include the tapered front surfaces 64 and tapered rear surface 66, together with the burnishing pad locations and the gram load of the burnishing head 10 are such that the burnishing head 10 flies on the surface air cushion of the moving disk 120. In this regard, the general flying characteristics of the burnishing head 10 are similar to the flying characteristics of magnetic head sliders of hard disk drives, which flying characteristics are well known to those skilled in the art. Thereafter, the rotational speed of the disk 116 is reduced, and in response thereto, the burnishing head 10 flies lower towards the disk surface 122. The disk RPM is further reduced until the tapered surface 66 of the rearward pad 60 makes contact with the disk surface 122 while the leading burnishing pads 44 and 48 are still flying above the surface 122 of the disk. This burnishing head configuration, wherein the rearward burnishing pad 60 makes contact with the disk surface 122 while the forward pads 44 and 48 fly above the disk surface is termed "contact flying" herein. It is significant to understand, as depicted in FIG. 8, that when the burnishing pad 10 is in a contact flying orientation that the burnishing edges of the burnishing pads are disposed at different heights relative to the surface 122 of the disk 116. As is described in detail herebelow, the differing heights of the burnishing edges facilitate the cutting off of projecting asperities of the disk surface at decreasing heights, and that low asperities can pass beneath the lowest burnishing edge of the rearward burnishing pad 60 without being burnished. It is to be realized that the pitch angle p in FIG. 8 is significantly exaggerated for the purposes of depiction herein, and, owing to the physical size of a typical burnishing head 10 and the relatively small size of projecting asperities, that a typical pitch angle p is generally approximately 20–40 microradians as is described in greater detail herebelow with the aid of FIGS. 9, 10 and 11.

Figure 9:
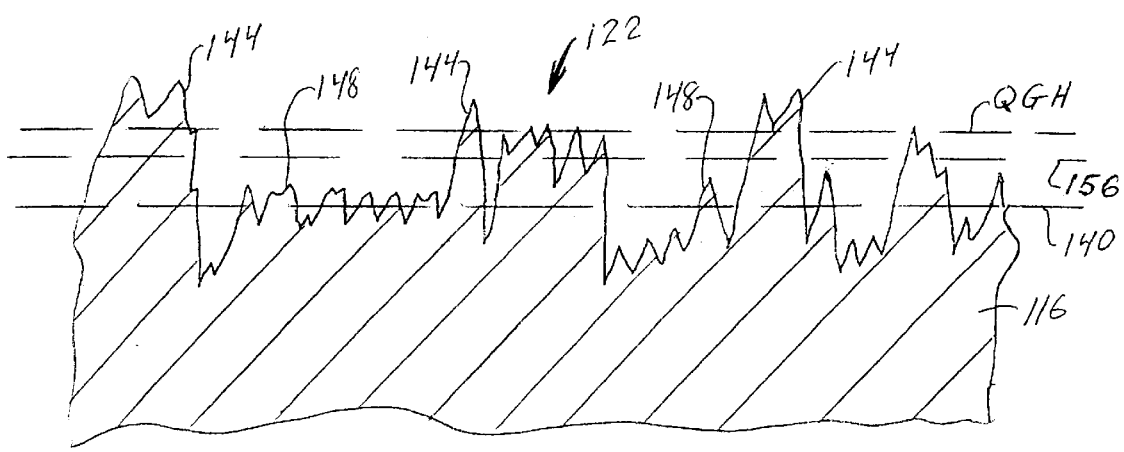
FIG. 9 is a side elevational view depicting a hard disk surface prior to disk burnishing.
Figure 10:
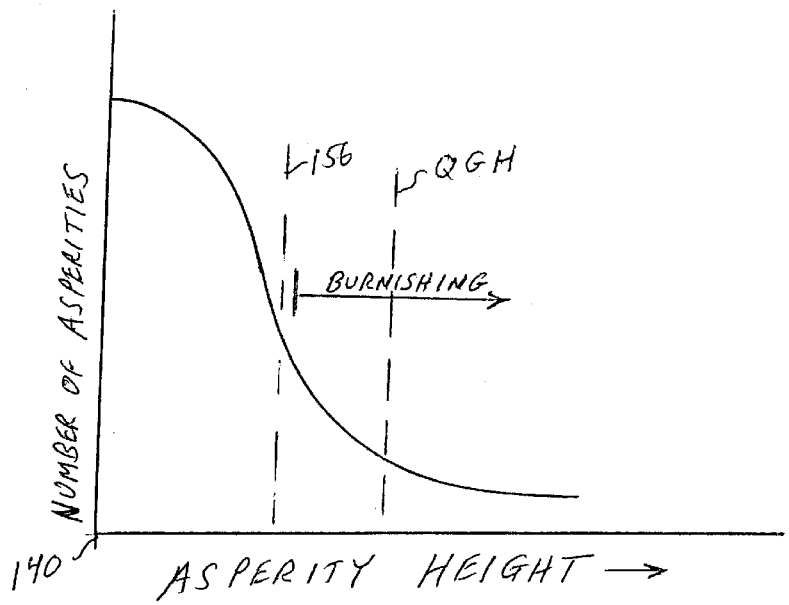
FIG. 10 is a graphical representation of asperity height of a hard disk before burnishing as may be found on the disk surface of FIG. 9.
Figure 11:
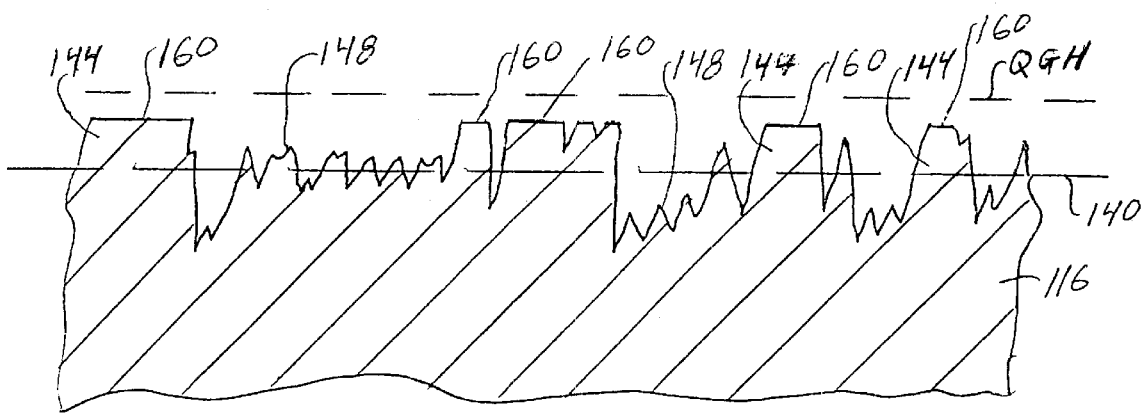
FIG. 11 is a side elevational view depicting the hard disk surface following burnishing conducted according to the burnishing method of the present invention.

FIG. 9 is a side elevational view generally depicting the surface 122 of a hard disk 116 prior to burnishing, FIG. 10 is a graph generally depicting the asperity height distribution of the disk 116, and FIG. 11 is a side cross-sectional view showing the disk of FIG. 9 following burnishing. As depicted in FIG. 9, prior to burnishing, the surface 122 of a disk 116 includes many peaks and valleys. From a nominal surface line 140 it is the highest peaks, such as peaks 144 that constitute the asperities that can cause problems should a flying slider magnetic head encounter them. Low peaks, such as peaks 148 are not problematical in that the glide height of a magnetic head slider is significantly above the projection heights of the low peaks. The method of the present invention seeks to orient the burnishing pads of the burnishing head 10 to remove the high asperities 144 while leaving the low asperities 148 undisturbed. In so doing, the amount of debris generated in the burnishing process is reduced because the low peaks are not removed.

To provide a fuller understanding, FIG. 10 graphically depicts the asperity height distribution of a disk such as disk 116. FIG. 10 is a half bell curve in that the bell curve is centered at a nominal height 140 such that the missing half of the bell curve represents valleys in the disk surface. With regard to the asperity height distribution depicted in FIG. 10, it is seen that the number of asperities shown on the vertical axis is greatest for the lower height asperities 148, and that relatively few asperities of significant height exist. Also depicted in FIG. 10 is a vertical line 156 that generally indicates the lower burnishing height of the burnishing head 10 in its contact flying configuration. That is, it is generally the height of the burnishing edge of the rearward burnishing pad 60 of the burnishing head 10. The burnishing edges of the more forward burnishing pads are located at greater heights due to the positive pitch angle p of the contact flying burnishing head 10, as depicted in FIG. 8. It is therefore the case that asperities higher than the height 156 of the burnishing head 10 will be burnished by the burnishing head 10, whereas asperities having a lower height than the lower burnishing height 156 will not be burnished by the burnishing head 10. Therefore, as depicted in FIG. 11, following the burnishing process of the present invention, high asperities 144 have been burnished down 160 to the height 156, whereas low asperities 148 have not been burnished.

In a typical disk burnishing process of the present invention, disk burnishing commences with a disk rotating at a high velocity, such that the burnishing head 10 fully flies above the disk surface. Thereafter, the disk velocity is reduced until a disk surface speed is reached at which contact flying occurs with the burnishing head contact flying at the inner diameter 124 of the disk 116. As the disk rotates the burnishing pad is cycled outwardly to the outer diameter and then cycled back to the inner diameter to complete one pass of the burnishing head over the disk surface 122. The disk RPM and burnishing head radial speed are generally such that each point on the disk surface passes beneath each burnishing pad approximately 16 times during each pass; that is, eight times during the outward burnishing head cycle and eight times during the inward returning burnishing head movement to complete a pass. As is typical in the industry, each disk is tested following the burnishing process. Such testing is conducted by flying a test magnetic head slider over the surface of the disk at a relatively low flying height that is generally referred to as the qualification glide height (QGH). For completeness of understanding, the qualification glide height is represented in FIGS. 9, 10 and 11. The occurrence of a single head strike, whether caused by an asperity or a remaining piece of debris is a sufficient cause to fail the burnished disk. Such a failed disk is typically burnished a second time in the expectation of removal of the offending asperity or debris.

For the particular burnishing head configuration depicted in FIGS. 1–6 and described hereabove, a burnishing device such as that depicted in FIG. 1 utilizes a burnishing head gram load of approximately 1 gram and a disk surface velocity of approximately 11 meters per second during the burnishing process. The burnishing head 10 then has a lower burnishing height 156 of approximately 10–12 nanometers and a positive pitch angle of approximately 30 microradians is obtained, such that a disk with a qualification glide height of approximately 24–30 nanometers is achieved.

For burnishing head development and test purposes, the flying characteristics of a particular burnishing head according to the present invention may be determined acoustically. That is, with the disk turning at a speed of approximately 18 meters per second the burnishing head is lowered towards the disk surface. Due to the high velocity of the disk surface, the burnishing head flies above the disk surface and the acoustical sensor detects background noise. Thereafter, the disk speed is decreased until the acoustical sensor registers a significant signal, indicating that the trailing burnishing pad is making contact with the disk surface. At this disk velocity, contact flying of the burnishing pad is established. Thereafter, as the disk speed is further decreased, the acoustic sensor detects a slowly increasing signal, generally indicating that the burnishing head is still contact flying although the pitch angle is decreasing and more of the burnishing pads are making contact with asperities on the surface of the disk. When the disk velocity is decreased sufficiently, the burnishing head ceases contact flying and becomes in fall contact with the disk surface, whereupon the acoustic sensor signal increases rapidly. Therefore, for a particular burnishing head configuration, such as that depicted in FIGS. 1–6, a range of disk surface velocities can be determined in which a burnishing head of that design will be contact flying according to the present invention. Thereafter, in the disk burnishing step of the disk manufacturing process, the disk burnishing is started at a high disk surface velocity and is then nominally conducted at the lower chosen disk surface velocity, such that contact flying burnishing of the present invention will occur.

Because the burnishing method of the present invention removes only the relatively few high asperities 144 that are problematical, while leaving the more numerous low asperities 148 which do not cause glide height problems, the quantity of debris that is generated during the burnishing process of the present invention is significantly less than the debris created by prior art full contact burnishing heads, which generally remove both high asperities and significant portions of the low asperities, thereby creating significantly more burnishing debris that must be removed from the disk surface. Because the burnishing method of the present invention creates significantly less burnishing debris, disks burnished according to the present invention have a significantly greater passing rate than disks burnished in prior art burnishing methods. Production yield is thereby increased. Additionally, the burnishing head wear of the burnishing edges is significantly reduced because all of the burnishing edges are involved in the burnishing of asperities of differing heights because the burnishing edges are disposed at differing heights due to the positive pitch angle p of the contact flying head. The useful lifetime of the burnishing head is thereby increased, and the positive pitch angle p of the burnishing head also prevents disk gouging by the front burnishing edge.

While the invention has been shown and described with regard to certain preferred embodiments it is to be understood that certain alterations and modifications in form and detail will occur to those skilled in the art following review of this specification. It is therefore intended by the inventors that the following claims cover all such alterations and modifications that include the true spirit and scope of the invention set forth herein.

What I claim is:

1. A method for burnishing a hard disk, comprising the steps of:

rotating a hard disk having at least one disk surface to be burnished in a disk burnishing device, said burnishing device including a disk burnishing head mounted therein; wherein said burnishing head includes a solid body having generally rectangular surfaces, including an upper surface, a burnishing pad surface, a front surface, a rear surface and two side surfaces; and a plurality of burnishing pads being disposed upon said burnishing pad surface, each said burnishing pad having a triangularly shaped outer surface and a burnishing edge that is generally parallel to said front surface;

placing said burnishing head upon said rotating hard disk such that said burnishing head is disposed in a contact flying orientation relative to said surface to be burnished;

moving said burnishing head relative to said rotating disk surface while maintaining said contact flying orientation.

2. A method for burnishing a hard disk as described in claim 1 wherein said contact flying orientation includes an orientation of said burnishing head wherein a first portion of said burnishing head is disposed in contact with said disk surface, while other portions of said burnishing head are disposed above said disk surface.

3. A method for burnishing a hard disk as described in claim 2 wherein said burnishing head is disposed with a positive pitch angle of approximately 20 to 40 microradians relative to said disk surface when said burnishing head is disposed in said flying contact orientation.

4. A method for burnishing a hard disk as described in claim 3 wherein said first portion of said burnishing head is located at a rearward portion of said burnishing head.

5. A method for burnishing a hard disk as described in claim 3 wherein said disk is rotated at a sufficient velocity such that said positive pitch angle is maintained while said burnishing head is moved relative to said rotating disk surface.

6. A method for burnishing a hard disk as described in claim 2 wherein said burnishing pads are configured upon said burnishing pad surface such that two frontward leading pads are disposed proximate said front surface in a spaced apart relationship, one middle leading pad is disposed rearwardly of said two frontward leading pads and generally between said two frontward leading pads, two rear pads are disposed generally rearwardly of said middle leading pad in a spaced apart relationship, and one rearward pad is disposed rearwardly of said two rear pads and generally between said two rear pads; and wherein said first portion of said burnishing head includes portions of said rearward pad.

7. A method for burnishing a hard disk as described in claim 6 wherein said rearward pad is formed with a tapered outer surface that slopes towards said rear surface of said burnishing head, and wherein said first portion of said burnishing head is located proximate said tapered outer surface of said rearward pad.

8. A method for burnishing a hard disk as described in claim 7 wherein said two front leading pads are formed with a tapered outer surface that slopes towards said front surface of said head.

9. A method for burnishing a hard disk as described in claim 6 wherein said frontward leading pads are disposed at a greater height above said disk surface than said rearward pad, when said burnishing head is disposed in said contact flying orientation.

10. A method for burnishing a hard disk as described in claim 6 wherein some of said burnishing pads burnish asperities of said surface at different heights than other ones of said burnishing pads.

11. A method for burnishing a hard disk as described in claim 6 wherein said frontward leading pads burnish asperities at a greater height above said disk surface than said middle leading pad, and said middle leading pad burnishes asperities at a greater height than said rear pads, and said rear pads burnish asperities at a greater height than said rearward pad.

12. A method for burnishing a hard disk as described in claim 1 wherein said velocity of said disk surface relative to said burnishing head is from 8 to 14 meters per second and wherein said burnishing head is disposed in a contact flying orientation having a gram load of approximately 1 gram.

* * * * *